(12) United States Patent
Futagi et al.

(10) Patent No.: US 7,778,350 B2
(45) Date of Patent: Aug. 17, 2010

(54) MULTI-CARRIER COMMUNICATION DEVICE, AND MULTI-CARRIER COMMUNICATION METHOD

(75) Inventors: Sadaki Futagi, Sendai (JP); Takashi Kitahara, Sendai (JP)

(73) Assignee: Panasonic Corporation, Osaka (JP)

( * ) Notice: Subject to any disclaimer, the term of this patent is extended or adjusted under 35 U.S.C. 154(b) by 232 days.

(21) Appl. No.: 12/067,801

(22) PCT Filed: Aug. 31, 2006

(86) PCT No.: PCT/JP2006/317219

§ 371 (c)(1),
(2), (4) Date: Mar. 21, 2008

(87) PCT Pub. No.: WO2007/037091

PCT Pub. Date: Apr. 5, 2007

(65) Prior Publication Data

US 2009/0180574 A1    Jul. 16, 2009

(30) Foreign Application Priority Data

Sep. 28, 2005   (JP)   ............................. 2005-282458

(51) Int. Cl.
*H04L 27/00*   (2006.01)
*H04L 23/00*   (2006.01)
*H04J 11/00*   (2006.01)

(52) U.S. Cl. ..................... 375/295; 375/377; 370/210

(58) Field of Classification Search ................ 375/260, 375/285, 295, 296, 297, 298, 377; 370/206, 370/208, 210; 332/103, 106, 107, 117, 123, 332/149, 159

See application file for complete search history.

(56) References Cited

U.S. PATENT DOCUMENTS

| 7,535,869 | B2 * | 5/2009 | Yoon et al. | 370/329 |
|---|---|---|---|---|
| 7,551,546 | B2 * | 6/2009 | Ma et al. | 370/208 |
| 7,564,906 | B2 * | 7/2009 | Wang et al. | 375/260 |
| 2005/0157639 | A1 * | 7/2005 | Song et al. | 370/208 |
| 2006/0160498 | A1 * | 7/2006 | Sudo | 455/103 |

FOREIGN PATENT DOCUMENTS

| JP | 07046219 A | 2/1995 |
|---|---|---|
| JP | 10336139 A | 12/1998 |

(Continued)

*Primary Examiner*—Tesfaldet Bocure
(74) *Attorney, Agent, or Firm*—Dickinson Wright PLLC (57) ABSTRACT

Provided is a multi-carrier communication device capable of reducing the deterioration of a reception quality while suppressing the peak power of a multi-carrier signal. In this device, a clipping strain measurement unit (108) calculates the individual average powers (or the clipping strain powers) of peak suppression signals contained in a center area and in end areas. Moreover, the clipping strain measurement unit (108) uses the calculated clipping strain, to calculates the ratios of the signal powers to the clipping strain powers (or the ratios of the signals to the clipping strains) individually for the center area and the end areas, and outputs the calculated ratios of the signals to the clipping strains to a puncture-modulation mode selection unit (109). On the basis of the ratios of the signals to the clipping strains for the individual areas, the puncture-modulation mode selection unit (109) selects the encoding percentage, the modulation mode or the power of the transmission data to be superposed on the individual areas.

8 Claims, 7 Drawing Sheets

FOREIGN PATENT DOCUMENTS

| | | |
|---|---|---|
| JP | 11145928 A | 5/1999 |
| JP | 200092022 A | 3/2000 |
| JP | 2001223665 A | 8/2001 |
| JP | 2004135087 A | 4/2004 |
| JP | 2004187257 A | 7/2004 |

* cited by examiner

RELATED ART

| SIGNAL TO CLIPPING DISTORTION RATIO | CODING RATE | MODULATION SCHEME |
|---|---|---|
| 8 dB | R=1/2 | QPSK |
| 10 dB | R=3/4 | QPSK |
| 13 dB | R=1/2 | 16 QAM |
| 15 dB | R=3/4 | 16 QAM |

MULTI-CARRIER COMMUNICATION DEVICE, AND MULTI-CARRIER COMMUNICATION METHOD

TECHNICAL FIELD

The present invention relates to a multicarrier communication apparatus and multicarrier communication method. In particular, the present invention relates to a multicarrier communication apparatus and multicarrier communication method for suppressing peak power by clipping.

BACKGROUND ART

Recently, as a technique of improving communication quality by increasing robustness for frequency selective fading, for example, the OFDM (Orthogonal Frequency Division Multiplexing) scheme and MC-CDMA (Multi Carrier-Code Division Multiple Access) scheme have attracted attention.

In a multicarrier communication scheme, although a signal is transmitted using a plurality of subcarriers with different frequencies, when phases of modulated signals of subcarriers are the same, significant peak power may be provided by combining these signals. When a signal with significant peak power is amplified, the dynamic range is wide and, consequently, an amplifier providing a high linearity is needed for amplifying the signal. However, realizing the amplifier with high linearity is quite difficult while a high efficiency is maintained. Therefore, in a multicarrier communication scheme, there is a problem of reducing peak power.

Up till now, as a method of suppressing peak power in a multicarrier communication scheme, clipping processing of cutting peak components forcibly has been studied. For example, Patent Document 1 discloses extracting a peak component with greater power than a threshold from a multicarrier signal and limiting the amplitude of this peak component. Generally, the likelihood of peak power occurring decreases exponentially according to power, and, consequently, the effect of error characteristics improved by an increase of effective transmission power is greater than the effect of error characteristics degraded by clipping distortion. Thus, according to this method, peak components are subject to amplitude limit, which causes clipping distortion, and, as a result, error characteristics deteriorate. However, power components lower than a threshold are not subject to clipping and are amplified without distortion, so that effective transmission power is increased and the effect of improved error characteristics is yielded.

Patent Document 1: Japanese Patent Application Laid-Open No. HEI 7-46219

DISCLOSURE OF INVENTION

Problems to be Solved by the Invention

Figure 1:
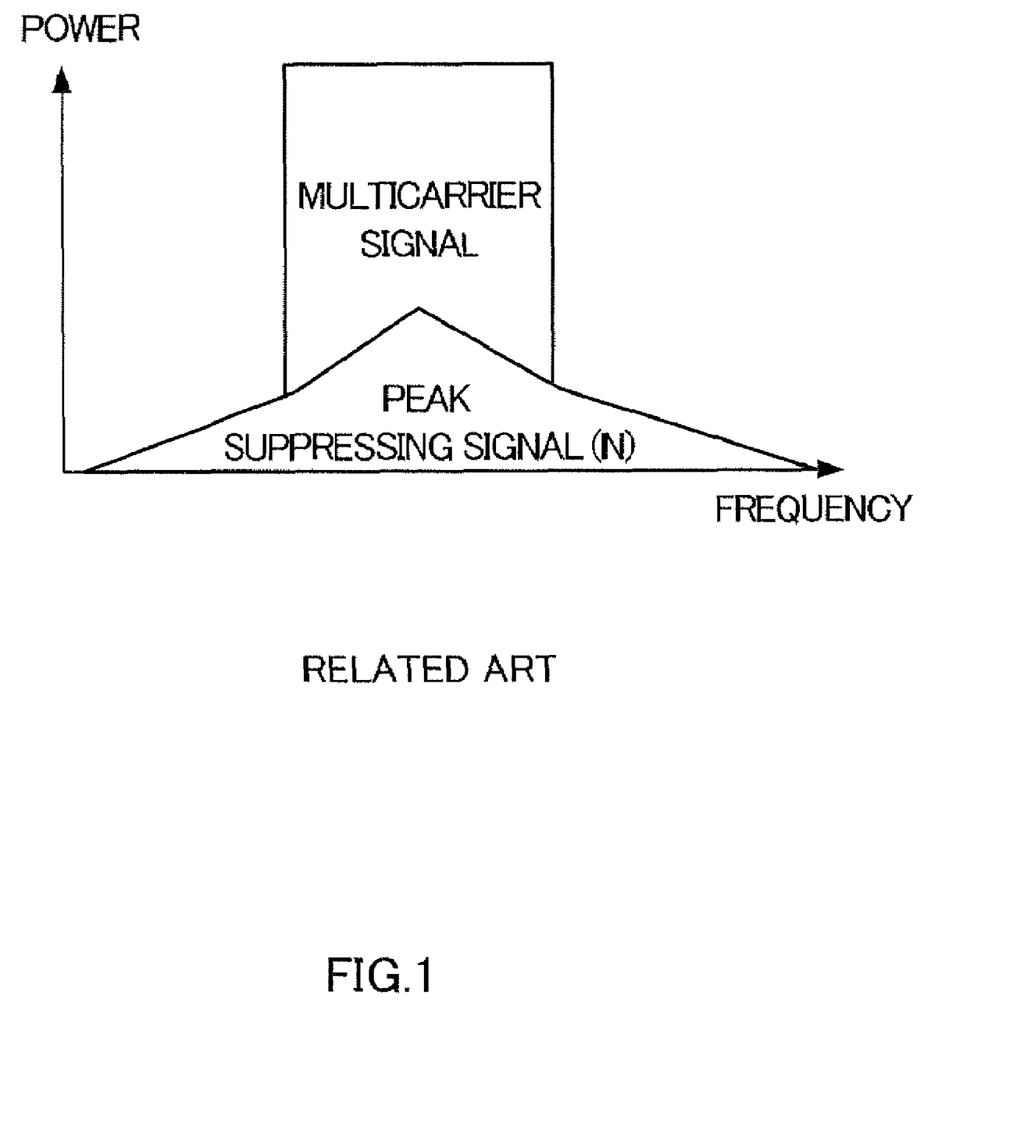
FIG. 1 illustrates a frequency characteristic of a multicarrier signal and a peak suppressing signal subjected to clipping due to amplitude limit.

However, in the above-described method, there is a problem that demodulation characteristics become poor in positions closer to the center frequency of a multicarrier signal. FIG. 1 illustrates frequency characteristics of a multicarrier signal and a peak suppressing signal subjected to clipping. That is, as shown in FIG. 1, peak suppression distortion becomes greater in positions closer to the center frequency of a multicarrier signal. Therefore, by providing amplitude limit and cutting peak components uniformly, reception characteristics may be likely to deteriorate in positions closer to the center frequency.

It is therefore an object of the present invention to provide a multicarrier communication apparatus and multicarrier communication method for suppressing peak power of a multicarrier signal and reducing deterioration of received quality due to peak power suppression.

Means for Solving the Problems

To solve the above-described problems, the multicarrier communication apparatus according to the present invention employs a configuration having: a generating section that generates a multicarrier signal by superimposing a transmission signal over a plurality of subcarriers; a peak power suppressing section that suppresses power appearing in the multicarrier signal and being equal to or greater than a predetermined value; a suppression distortion calculating section that divides all subcarriers into a central portion including a center subcarrier and edge portions adjacent to the central portion, and calculates suppression distortion of the multicarrier signal subjected to peak power suppression in the central portion and in the edge portions separately; and a selecting section that selects a coding rate, modulation scheme and power of a transmission signal superimposed over the central portion apart from the edge portions, based on the suppression distortion of the central portion.

With this configuration, the greater suppression distortion is estimated in the central portion than in the edge portions. As a result, selected coding rate, modulation scheme and power have greater error robustness for a transmission signal to be superimposed over the central portion than a transmission signal to be superimposed over the edge portions. That is, by selecting the coding rates, modulation schemes and power of the central portion and the edge portions, coding rate selection, modulation scheme selection and power selection processing can be performed according to the actual characteristics of suppression distortion occurring, so that it is possible to suppress peak power of a multicarrier signal and reduce deterioration of received quality due to the peak power suppression together, without reducing transmission speed and increasing transmission power excessively. Further, it is possible to simplify the above-noted processing significantly compared to a case where the coding rate, modulation scheme and power of each subcarrier are selected based on the suppression distortion of each subcarrier.

ADVANTAGEOUS EFFECT OF THE INVENTION

According to the present invention, it is possible to suppress peak power of a multicarrier signal and reduce deterioration of received quality due to peak power suppression.

BEST MODE FOR CARRYING OUT THE INVENTION

The present inventors have focused on the characteristic that, if peak suppressing processing is performed on a multicarrier signal, peak suppression distortion becomes greater in positions closer to the central frequency of the multicarrier signal. That is, the present inventors have arrived at the present invention thinking that assigning a modulated signal with distortion robustness (i.e., noise robustness) to a subcarrier with significant peak suppression distortion would improve error rate characteristic in a subcarrier which is likely to be subject to the influence of peak suppression distortion.

Embodiments of the present invention will be explained below in detail with reference to the accompanying drawings. In the following explanations, as an example of multicarrier communication, communication is assumed to be performed by the OFDM scheme where a symbol is generated by assigning data to a plurality of subcarriers orthogonal to each other in the frequency domain.

EMBODIMENT 1

Figure 2:
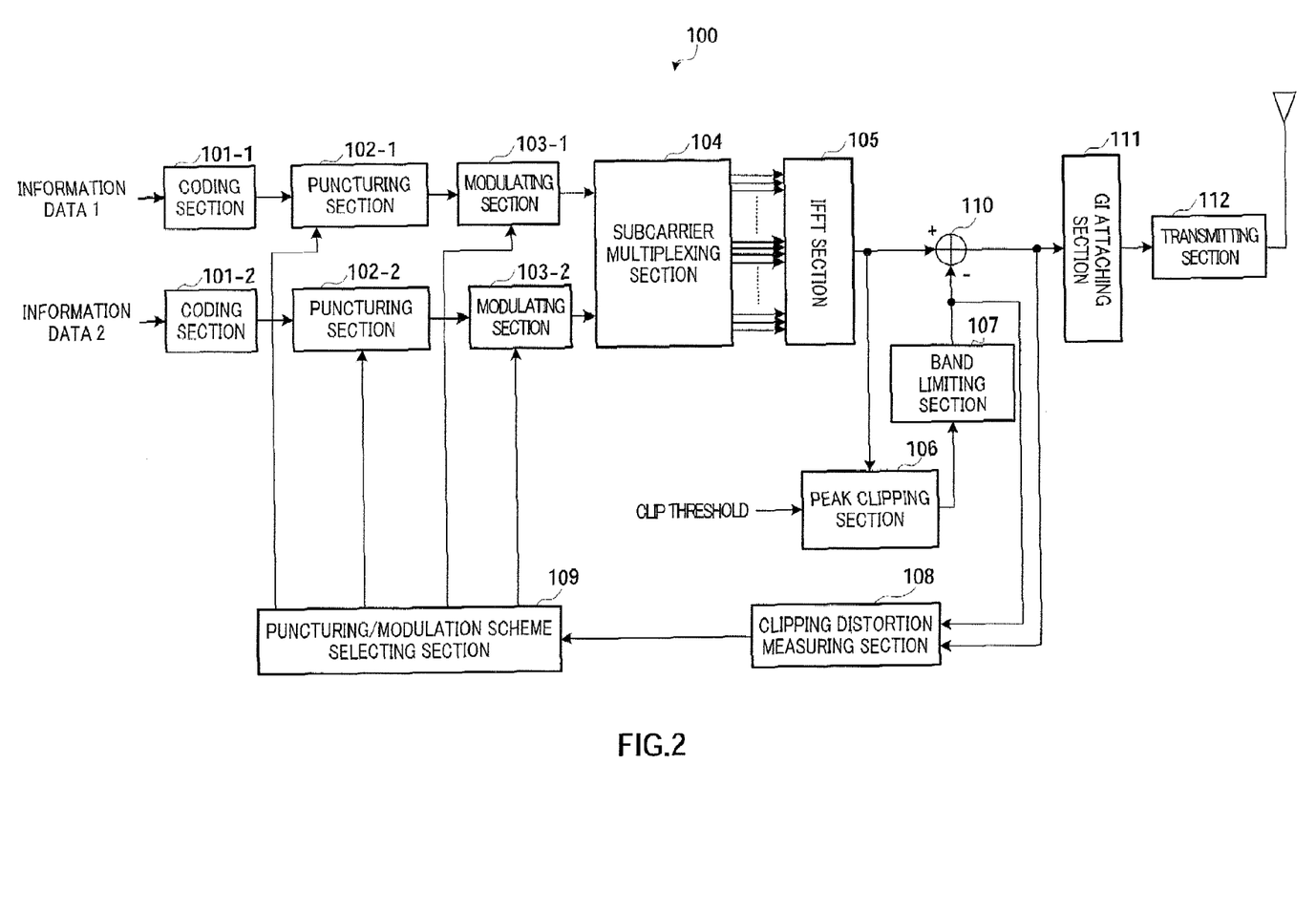
FIG. 2 is a block diagram showing main components of a transmission section of a multicarrier communication apparatus according to Embodiment 1 of the present invention.

FIG. 2 illustrates main components of a transmission section of the multicarrier communication apparatus according to Embodiment 1 of the present invention. As shown in FIG. 2, the transmission section of the multicarrier communication apparatus according to the present embodiment employs a configuration having coding sections 101-1 and 101-2, puncturing sections 102-1 and 102-2, modulating sections 103-1 and 103-2, subcarrier multiplexing section 104, IFFT (Inverse Fast Fourier Transform) section 105, peak clipping section 106, band limiting section 107, clipping distortion measuring section 108, puncturing/modulation scheme selecting section 109, subtractor 110, GI (Guard Interval) attaching section 111 and transmitting section 112.

Figure 3:
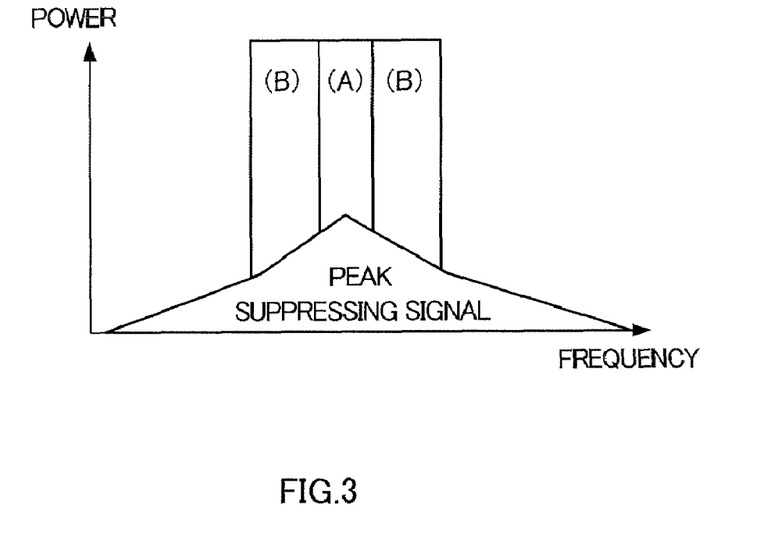
FIG. 3 illustrates a state where subcarriers are divided into groups by clipping distortion according to Embodiment 1.

With the present embodiment, as shown in FIG. 3, according to characteristics of a peak suppressing signal, subcarriers are assumed to be divided into area (A) (hereinafter "central portion") comprised of a predetermined, fixed number of subcarriers including center subcarriers and area (B) (hereinafter "edge portions") comprised of subcarriers of both edge portions adjacent to the central portion, and respective coding modulation schemes are assumed to be applied to these areas. Therefore, although a configuration will be presented here with two puncturing sections and two modulating sections, the number of areas to be divided is not limited to two. That is, subcarriers included in the edge portions may be further divided into a plurality of areas according to characteristics of a peak suppressing signal, and puncturing sections and modulating sections may be provided according to the number of areas.

Coding sections 101-1 and 101-2 perform error correcting coding for two-sequence of information data streams (data 1 and 2), attach parity bits to these information sequences and output data subjected to error correcting coding to puncturing sections 102-1 and 102-2.

Puncturing sections 102-1 and 102-2 puncture parity bits from the data subjected to error correcting coding by puncturing, and output the data after puncturing to modulating sections 103-1 and 103-2.

Modulating sections 103-1 and 103-2 perform modulation processing on the data after puncturing and output the modulated data to subcarrier multiplexing section 104.

Subcarrier multiplexing section 104 performs S/P conversion for the modulated data, maps the converted data in each subcarrier and output the mapped parallel data to IFFT section 105.

By performing an inverse fast Fourier transform for the parallel data, IFFT section 105 generates the time domain OFDM signal where parallel data are superimposed over a plurality of subcarriers, and outputs the generated OFDM signal to peak clipping section 106 and subtracter 110.

Peak clipping section 106 compares the power of the time domain OFDM signal to a predetermined threshold, and, if the power is equal to or greater than the threshold, outputs to band limiting section 107 a signal with power over the threshold, that is, a signal subtracting the amplitude level corresponding to the threshold from the time domain OFDM signal. That is, peak clipping section 106 outputs a peak suppressing signal with power equal to or greater than a predetermined threshold out of the time domain OFDM signals. Further, instead of power, amplitude of OFDM signals may be compared to a predetermined threshold.

Band limiting section 107 performs band limit for the peak suppressing signal by filtering, and outputs the peak suppressing signal subjected to band limit to clipping distortion measuring section 108 and subtractor 110.

Clipping distortion measuring section 108 measures peak suppression distortion (hereinafter also called "clipping distortion") included in the above-described central portion and edge portions. Calculating clipping distortion may use a method of converting a time domain peak suppressing signal into a frequency domain peak suppressing signal by the fast Fourier transform and calculating the average value of the time domain peak suppressing signals of subcarriers included in the central portion (or edge portions), and a method of calculating the power average of the time domain peak suppressing signals made to pass through a filter where the central portion (or edge portions) is passband, for example. Further, clipping distortion measuring section 108 calculates a signal power to clipping distortion ratio (hereinafter "signal to clipping distortion ratio") per central portion and per edge portions using the calculated clipping distortion, and outputs the calculated signal to clipping distortion ratio to puncturing/modulation scheme selecting section 109.

Figure 4:
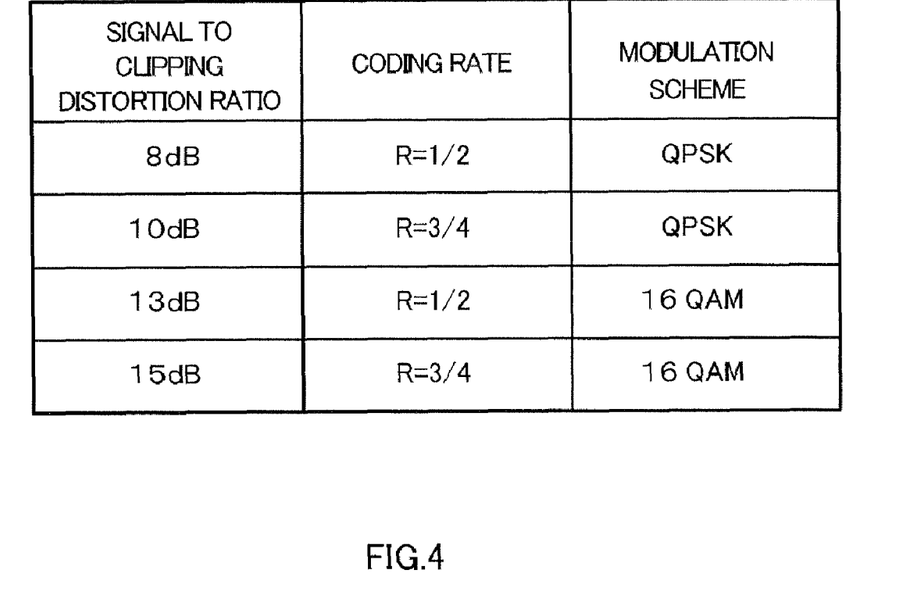
FIG. 4 illustrates an example of a reference table according to Embodiment 1.

Puncturing/modulation scheme selecting section 109 selects the coding rate and modulation scheme in the central portion and in the edge portions separately, based on the signal to clipping distortion ratio. To be more specific, puncturing/modulation scheme selecting section 109 has a table associating signal to clipping distortion ratios with coding rates or modulation schemes inside in advance, and compares the signal to clipping distortion ratio outputted from clipping distortion measuring section 108 to the reference table and selects the coding rate and modulation scheme. FIG. 4 illustrates an example of a reference table setting a coding rate and a modulation scheme per signal to clipping distortion ratio. The method of selecting a coding rate and modulation scheme will be described later. Puncturing/modulation scheme selecting section 109 outputs information of the selected coding rate and modulation scheme to puncturing sections 102-1 and 102-2 and modulating sections 103-1 and 103-2.

Subtractor 110 removes the peak signal by subtracting the output of band limiting section 107 from the time domain OFDM signal, and outputs this time domain OFDM signal without a peak signal, to clipping distortion measuring section 108 and GI attaching section 111.

GI attaching section 111 generates a guard interval by duplicating a tail end part of the time domain OFDM signal without a peak signal, attaches the generated guard interval to the head of the OFDM signal and generates an OFDM signal.

Transmitting section 112 performs predetermined radio transmitting processing (such as D/A conversion and up-conversion) on the OFDM signal with a guard interval and transmits the OFDM signal subjected to radio transmitting processing to a communicating party (not shown) via an antenna.

Next, the operation of the multicarrier communication apparatus configured as above will be explained.

First, two-sequence of information data streams (data 1 and 2) are outputted to coding sections 101-1 and 101-2, are subjected to error correcting coding, and parity bits are attached to these information data streams. Puncturing sections 102-1 and 102-2 puncture parity bits from data after error correcting coding. Here, parity bits are punctured using the coding rate selected by puncturing/modulation scheme selecting section 109 based on a signal to clipping distortion ratio.

Modulating sections 103-1 and 103-2 modulate data streams after puncturing. Here, a modulation scheme to be used is selected by puncturing/modulation scheme selecting section 109 based on the signal to clipping distortion ratio.

Subcarrier multiplexing section 104 performs S/P conversion for the modulated data, maps the parallel data subjected to S/P conversion to associated subcarriers and outputs the mapped parallel data to IFFT section 105. IFFT section 105 performs an IFFT for these mapped parallel data and generates the time domain OFDM signal where parallel data are superimposed over a plurality of subcarriers, and outputs this OFDM signal to peak clipping section 106 and subtractor 110.

Peak clipping section 106 compares power of the time domain OFDM signal to a predetermined threshold and outputs to band limiting section 107 a peak suppressing signal with power equal to or greater than the predetermined threshold, that is, a signal subtracting the amplitude level corresponding to the predetermined threshold from the OFDM signal.

Band limiting section 107 performs band limit for the peak suppressing signal by filtering and outputs the peak suppressing signal subjected to band limit to clipping distortion measuring section 108 and subtractor 110.

Clipping distortion measuring section 108 calculates as clipping distortion the average power of peak suppressing signals in the central portion and the edge portions separately, further calculates a signal to clipping distortion ratio per central portion and per edge portions, and outputs these signal to clipping distortion ratios to puncturing/modulation scheme selecting section 109.

Puncturing/modulation scheme selecting section 109 selects combinations of coding rates and modulation schemes in the central portion and edge portions according to the calculated signal to clipping distortion ratios. That is, puncturing/modulation scheme selecting section 109 has a table associating signal to clipping distortion ratios with coding rates or modulation schemes inside in advance, and compares signal to clipping distortion ratios in the central portion and edge portions outputted from clipping distortion measuring section 108 with the reference table and selects coding rates and modulation schemes in the central portion and edge portions. For example, puncturing/modulation scheme selecting section 109 has the reference table shown in FIG. 4 inside, and, when the signal to clipping distortion ratio is 10 dB, selects R=3/4 as a coding rate and QPSK as a modulation scheme.

Here, in the reference table, when a signal to clipping distortion ratio becomes greater, a coding rate or modulation scheme is set to make noise robustness higher. That is, when a signal to clipping distortion ratio becomes smaller, a coding rate is set smaller if the same modulation scheme, or the modulation scheme with smaller M-ary numbers is set with the same coding rate. As described above, features of a peak suppressing signal include providing higher power and greater influence of suppression distortion by clipping in positions closer to the center frequency. Consequently, clipping distortion in the central portion is greater than in the edge portions. Therefore, a combination of a coding rate and a modulation scheme to make noise robustness higher than in the coding modulation scheme of the edge portions, is selected as the coding modulation scheme of the central portion.

By this means, if a smaller coding rate is selected, the puncturing rate of parity bits becomes smaller by puncturing, so that it is possible to improve the effect of error correction. Further, even with the same coding rate, if a modulation scheme with a smaller M-ary number is selected, the distance between signal points becomes longer and the influence of noise becomes less, so that it is possible to improve error rate characteristics.

On the other hand, a peak suppressing signal is subjected to band limit by filtering in band limiting section 107 and subtracted from the time domain OFDM signal outputted from IFFT section 105 by subtractor 110, and this OFDM signal without peak suppressing signal is outputted to GI attaching section 111. GI attaching section 111 attaches a guard interval to the OFDM signal and transmits this OFDM signal with a guard interval to a communicating party (not shown) via transmitting section 112 and an antenna.

As described above, according to the present embodiment, coding rates and modulation schemes in the central portion and edge portions are selected, based on clipping distortion in the central portion where the power of a peak suppressing signal is relatively large and clipping distortion in the edge portions where the power of a peak suppressing signal is relatively small. Consequently, in the central portion which is likely to be subject to the influence of clipping distortion, a combination of a coding rate and a modulation scheme to make noise robustness higher than in the edge portions is employed, so that it is possible to suppress the influence of peak power suppression on received quality and reduce deterioration of received quality of multicarrier signals.

Further, the coding rate and modulation scheme in the central portion is selected based on clipping distortion of the apparatus, so that it is possible to select a coding modulation scheme capable of reducing deterioration of received quality without giving load to a communicating party.

Further, although a case has been described with the present embodiment where puncturing/modulation scheme selecting section 109 selects coding rates and modulation schemes in the central portion and edge portions based on signal to clipping distortion ratios in the central portion and edge portions, the coding rate and modulation scheme in the edge portions may be fixed, and the coding rate and modulation scheme in the central portion may be selected based on the clipping distortion in the central portion.

Further, a case has been described with the present embodiment where the central portion and edge portions are set in advance, when the amount of suppression in a peak clipping section becomes greater, the central portion may become wider. That is, when the amount of suppression in the peak clipping section becomes greater, clipping distortion becomes wider from the center subcarrier to the edge subcarriers. In view of this characteristic, by making the central portion wider when the amount of suppression becomes greater, a coding rate and modulation scheme can be selected flexibly in response to the spread of distortion based on the amount of suppression, so that it is possible to increase error robustness more adequately according to the amount of suppression.

EMBODIMENT 2

Figure 5:
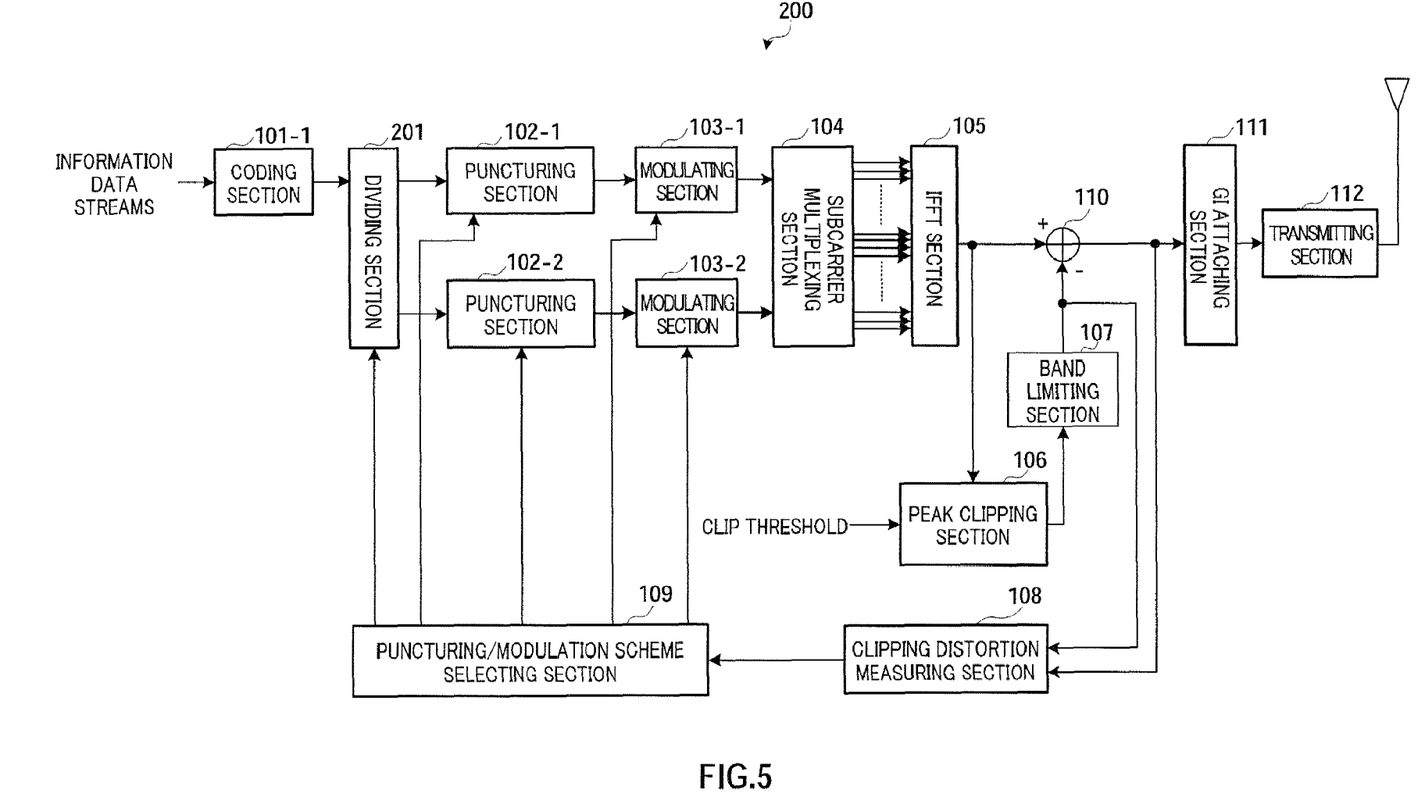
FIG. 5 is a block diagram showing main components of a transmission section of a multicarrier communication apparatus according to Embodiment 2 of the present invention.

FIG. 5 is a block diagram showing main components of the transmitting section of the multicarrier communication apparatus according to Embodiment 2 of the present invention. Here, in multicarrier communication apparatus 200 according to the present embodiment shown in FIG. 5, the same components as in FIG. 2 will be assigned the same reference numerals and explanations thereof will be omitted. FIG. 5 employs a configuration removing coding section 101-2 from and adding dividing section 201 to the configuration of FIG. 2.

Dividing section 201 divides an error correcting coding data stream subjected to error correcting coding by coding section 101-1 into two and outputs the divided error correcting coding data streams to puncturing sections 102-1 and 102-2.

Next, the operation of the multicarrier communication apparatus configured as above will be explained.

First, error correcting coding sequences are generated by performing error correcting coding for and attaching parity bits to information data streams in coding section 101-1. These error correcting coding data streams are divided by dividing section 201 and outputted to puncturing sections 101-1 and 101-2. The method of division will be explained below in detail.

First, dividing section 201 calculates a total number of bits to be assigned per OFDM symbol in the edge portions according to the coding rate in puncturing section 102-1, the modulation scheme employed by modulating section 103-1 and the number of subcarriers included in the edge portions to which modulated data is assigned through puncturing section 102-1 and modulating section 103-1. Here, the coding rate in puncturing section 102-1 and the modulation scheme employed by modulating section 103-1 may be determined in advance or may be selected by puncturing/modulation scheme selecting section 109.

Similarly, dividing section 201 calculates a total number of bits assigned per OFDM symbol in the central portion according to the coding rate selected by puncturing/modulation scheme selecting section 109 and employed by puncturing section 102-2, the modulation scheme employed by modulating section 103-2, and the number of subcarriers included in the central portion to which modulated data is assigned through puncturing section 102-1 and modulating section 103-2. Information associated with the coding rate employed by puncturing section 102-2 and the modulation scheme employed by modulating section 103-2, is reported from puncturing/modulation scheme selecting section 109 to dividing section 201.

Then, dividing section 201 divides data streams subjected to error correcting coding into two-sequence streams based on the comparison of these calculated total numbers of bits, and outputs these divided data streams subjected to error correcting coding to puncturing sections 102-1 and 102-2.

In the following explanations, as in Embodiment 1, puncturing sections 102-1 and 102-2 punctures data subjected to error correcting coding, modulating sections 103-1 and 103-2 generate modulated data by modulating the punctured data, and subcarrier multiplexing section 104 performs S/P conversion for the modulated data and maps the parallel data subjected to S/P conversion to the associated subcarrier. IFFT section 105 performs an IFFT for these mapped parallel data and generates the time domain OFDM signal where parallel data are superimposed over a plurality of subcarriers, and outputs this OFDM signal to peak clipping section 106 and subtractor 110.

Peak clipping section 106 compares the power of the time domain OFDM signal to a predetermined threshold and outputs to band limiting section 107 a peak suppressing signal with power equal to or greater than the predetermined threshold, that is, a signal subtracting the amplitude level corresponding to the predetermined threshold from the OFDM signal. The peak suppressing signal is subjected to band limit by filtering in band limiting section 107 and subtracted from the time domain OFDM signal outputted from IFFT section 105 by subtractor 110, and this OFDM signal without a peak suppressing signal is outputted to GI attaching section 111. GI attaching section 111 attaches a guard interval to the OFDM signal and transmits this OFDM signal with a guard interval to a communicating party (not shown) via transmitting section 112 and an antenna.

As described above, according to the present embodiment, by dividing one-sequence of information data streams into two-sequence of information data streams based on the total number of bits assigned to the central portion and edge portions and using coding rates and modulation schemes in these areas for the divided transmission data streams, so that the effect of error correction can be expected with respect to all information data streams uniformly and it is possible to reduce deterioration of received quality of multicarrier signals.

Further, the same error correcting code can be used for all information data assigned to the central portion and edge portions, so that it is possible to improve the effect of error correction more significantly when a systematic code where an error coding effect becomes more significant if the block length becomes greater (for example, turbo code), is used.

EMBODIMENT 3

Figure 6:
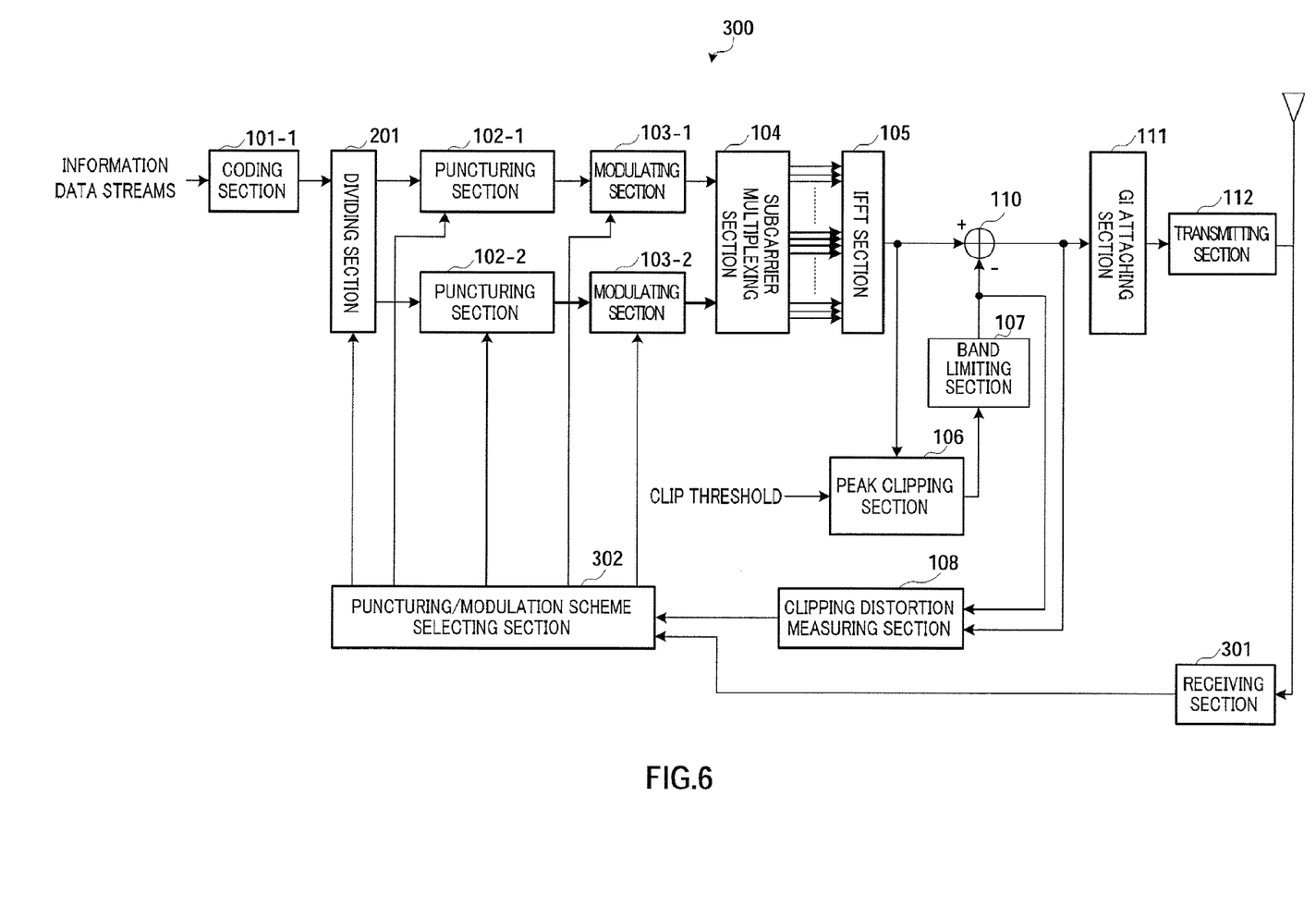
FIG. 6 is a block diagram showing main components of a multicarrier communication apparatus according to Embodiment 3 of the present invention.

FIG. 6 is a block diagram showing the configuration of the multicarrier communication apparatus according to Embodiment 3 of the present invention. Further, in multicarrier communication apparatus 300 according to the present embodiment shown in FIG. 6, the same components as in FIG. 5 will be assigned the same reference numerals and explanations thereof will be omitted. FIG. 6 employs a configuration removing puncturing/modulation scheme selecting section 109 and replacing puncturing/modulation scheme selecting section 302 with receiving section 301.

Receiving section 301 receives the multicarrier signal transmitted from a communicating party (not shown), acquires received quality information by performing radio receiving processing (such as down-conversion and A/D conversion) on this multicarrier signal and outputs the received quality information to puncturing/modulation scheme selecting section 302. In this case, received quality per carrier is measured by, for example, a communicating party (not shown) who receives the multicarrier signal transmitted from multicarrier communication apparatus 300, and this measurement result is reported to multicarrier communication apparatus 300 as received quality information.

Puncturing/modulation scheme selecting section 302 selects coding rates and modulation schemes of the central portion and edge portions based on received quality information (such as SIR, which means signal to interference ratio, and BER, which means bit error rate) in addition to signal to clipping distortion ratios. To be more specific, puncturing/modulation scheme selecting section 302 has a table associating signal to clipping distortion ratios and received quality information with coding rates or modulation schemes inside in advance, compares signal to clipping distortion ratios outputted from clipping distortion measuring section 108 and received quality information reported from a communicating party (not shown) with the reference table, and selects coding rates and modulation schemes. Thus, by selecting a coding rate and modulation scheme in consideration of received quality in addition to the signal to clipping distortion ratio, a coding rate and modulation scheme can be selected more adequately in consideration of channel condition, so that it is possible to improve error rate characteristics more reliably.

Next, the operation of multicarrier apparatus configured as above will be explained.

First, as in Embodiment 2, coding section 101-1 performs error correcting coding for information data streams and generates error correcting coding data streams by attaching parity bits to the information data streams subjected to error correcting coding. These error correcting coding data streams are divided by dividing section 201 and outputted to puncturing sections 101-1 and 101-2. Puncturing sections 102-1 and 102-2 punctures data subjected to error correcting coding, modulating sections 103-1 and 103-2 generate modulated data by modulating the punctured data, and subcarrier multiplexing section 104 performs S/P conversion for the modulated data and maps the parallel data subjected to S/P conversion to associated subcarriers. IFFT section 105 performs an IFFT for these mapped parallel data and generates the time domain OFDM signal where parallel data are superimposed over a plurality of subcarriers, and outputs this OFDM signal to peak clipping section 106 and subtractor 110.

Peak clipping section 106 compares the power of the time domain OFDM signal to a predetermined threshold and outputs to band limiting section 107 a peak suppressing signal with power equal to or greater than the predetermined threshold, that is, a signal subtracting the predetermined threshold from the OFDM signals.

Band limiting section 107 performs band limit for the peak suppressing signal by filtering and outputs the peak control signal subjected to band limit to clipping distortion measuring section 108 and subtractor 110.

Clipping distortion measuring section 108 calculates the average power of peak suppressing signals in the central portion and edge portions as clipping distortion, and further clipping distortion ratios in these areas, and outputs signal to clipping distortion ratios to puncturing/modulation selecting section 302.

Puncturing/modulation scheme selecting section 302 selects the coding rates and modulation schemes of the central portion and edge portions based on the calculated signal to clipping distortion ratios and received quality information reported from a communicating party (not shown). That is, puncturing/modulation scheme selecting section 302 has a table associating signal to clipping distortion ratios and received quality information with coding rates or modulation schemes inside in advance, compares signal to clipping distortion ratios outputted from clipping distortion measuring section 108 in the central portion and edge portions and reported received quality information with the reference table, and selects coding rates and modulation schemes in these areas.

As described above, according to the present embodiment, by selecting a coding rate and modulation scheme based on received quality in addition to clipping distortion, a coding rate and modulation scheme can be selected in consideration of channel condition more adequately, so that it is possible to improve error rate characteristics more reliably.

EMBODIMENT 4

Figure 7:
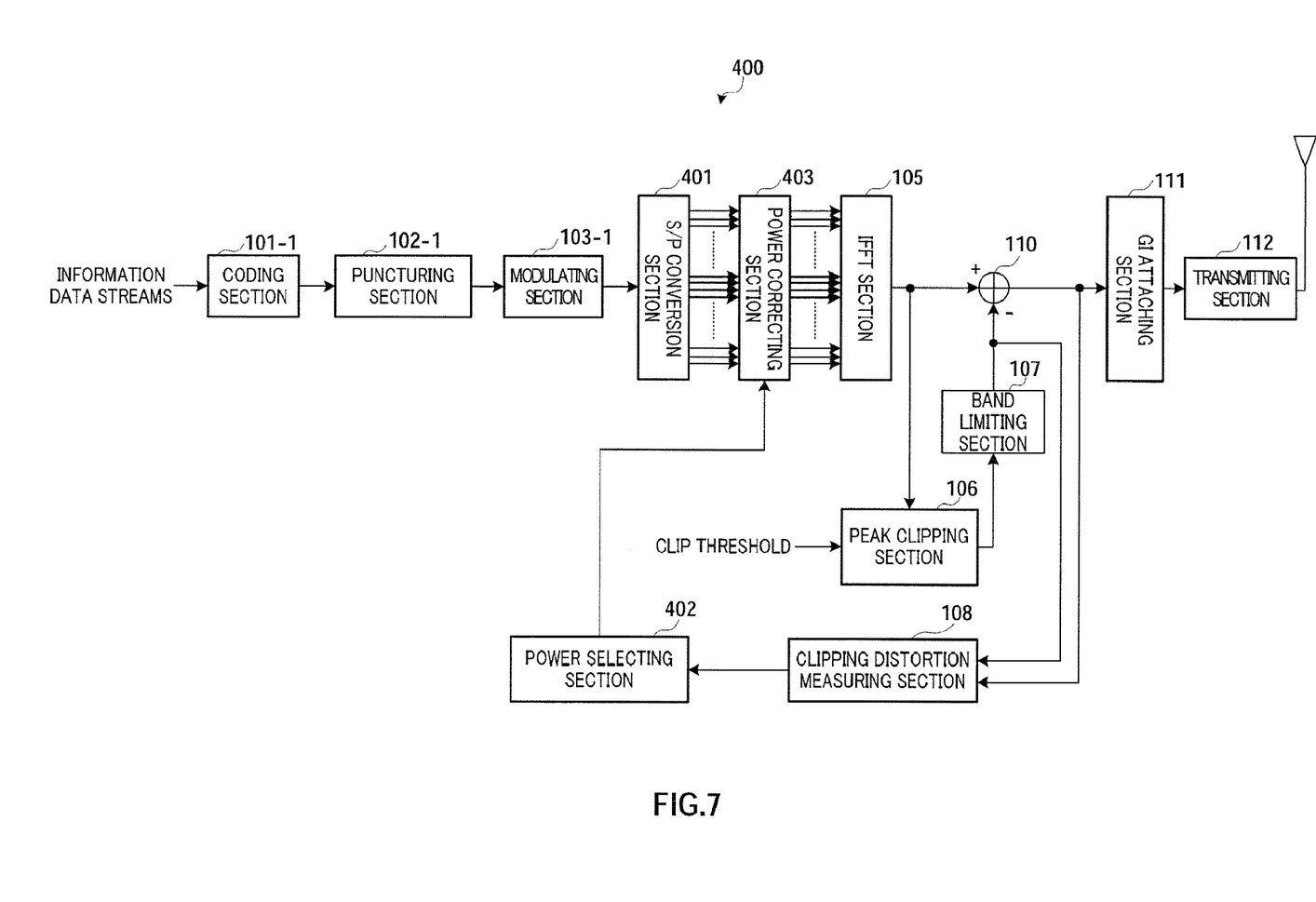
FIG. 7 is a block diagram showing main components of a transmission section of a multicarrier communication apparatus according to Embodiment 4 of the present invention.

FIG. 7 is a block diagram showing the configuration of the multicarrier communication apparatus according to Embodiment 4 of the present invention. Further, in multicarrier communication apparatus 400 of the present embodiment shown in FIG. 7, the same components as FIG. 2 will be assigned the same reference numerals and detail explanations thereof will be omitted. FIG. 7 employs a configuration removing coding section 101-2, puncturing section 102-2, modulating section 103-2, subcarrier multiplexing section 104 and puncturing/modulation scheme selecting section 109 from and adding S/P conversion section 401, power selecting section 402 and power correcting section 403 to the configuration of FIG. 2.

S/P conversion section 401 generates parallel data by performing S/P conversion for modulated data and outputs the generated parallel data to power correcting section 403.

Power selecting section 402 selects the power of the center subcarrier or the subcarrier that is the closest to the center subcarrier in the edge portions, based on clipping distortion in the central portion or the edge portions.

Figure 8:
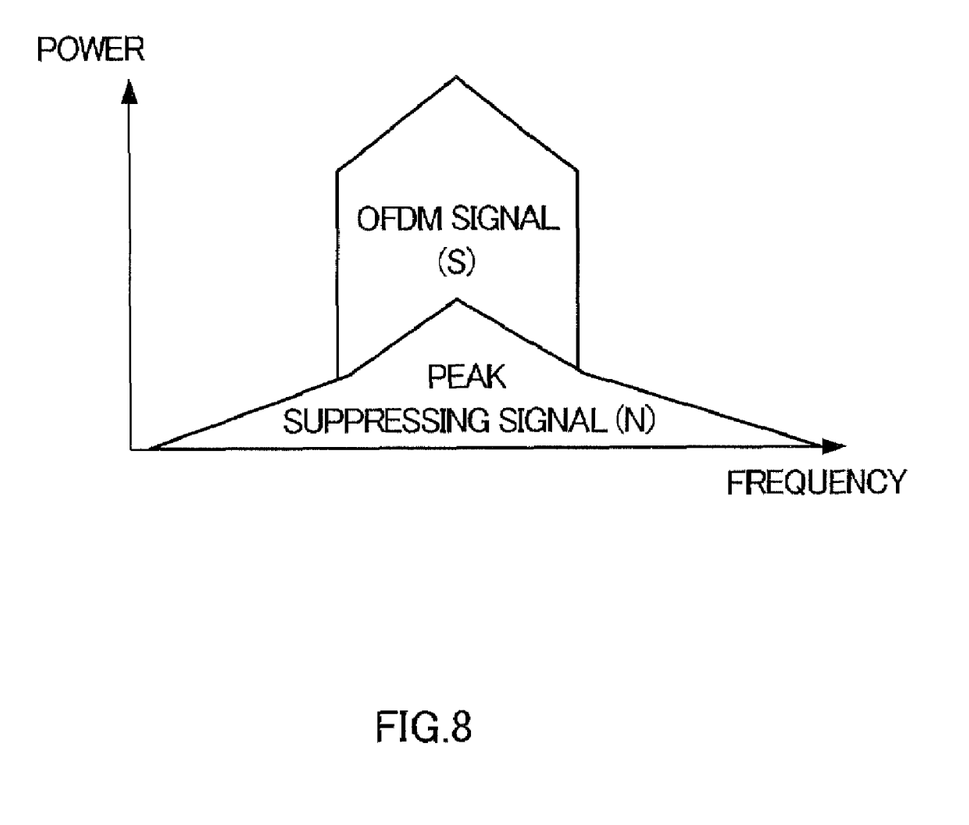
FIG. 8 illustrates an example of frequency characteristics of an OFDM signal and a peak suppressing signal that are subjected to power correction.

Power correcting section 403 corrects the power of parallel data based on the power selected by power selecting section 402. FIG. 8 illustrates an example of the frequency characteristic of an OFDM signal and peak suppressing signal after power correction. As shown in FIG. 8, power correcting section 403 corrects power such that the power of a transmission signal becomes greater in positions closer to the center subcarrier. That is, as described above, in view of greater power of a peak suppressing signal in positions closer to the center subcarrier, by setting the transmission power of a peak suppressing signal greater in positions closer to the center subcarrier, gain can be yielded in a subcarrier which is likely to be subject to the influence of clipping distortion, so that it is possible to reduce the influence of peak power suppression on received quality. Power correcting section 403 outputs the parallel data subjected to power correction to IFFT section 105.

Next, the operation of the multicarrier communication apparatus configured as above will be explained.

First, coding section 101-1 performs error correcting coding for an information data stream and puncturing section 102-1 punctures parity bits from the data stream subjected to error correcting coding. Modulating section 103-1 generates modulated data by modulating the data stream subjected to puncturing and outputs the modulated data to S/P conversion section 401.

S/P conversion section 401 performs S/P conversion for the modulated data and outputs the parallel data after S/P conversion to power correcting section 403. Power correcting section 403 corrects the power of the parallel data and outputs the parallel data subjected to power correction to IFFT section 105. By performing inverse fast Fourier transform for the outputted parallel data, IFFT section 105 generates the time domain OFDM signal where parallel data are superimposed over a plurality of subcarriers, and outputs this OFDM signal to peak clipping section 106 and subtractor 110.

Peak clipping section 106 compares the power of the time domain OFDM signal to a predetermined threshold and outputs to band limiting section 107 a peak suppressing signal with power equal to or greater than the predetermined threshold, that is, a signal subtracting the amplitude level corresponding to the predetermined threshold from the OFDM signal Band limiting section 107 performs band limit for the peak suppressing signal by filtering and outputs the peak control signal subjected to band limit to clipping distortion measuring section 108 and subtractor 110.

Clipping distortion measuring section 108 measures clipping distortion using the peak suppressing signal and outputs the measured clipping distortion. Power selecting section 402 selects the power of the subcarrier that is the closest to the center subcarrier based on the outputted clipping distortion in these areas and outputs the power of these areas to power correcting section 403.

Power correcting section 403 corrects the power of parallel data such that the power of a transmission signal becomes greater in positions closer to the center subcarrier.

As described above, according to the present embodiment, by performing power correction such that the transmission power becomes greater in positions closer to the center subcarrier, it is possible to set the power of the effective signal in positions where the power of peak suppressing signal is likely to be subject to the influence of clipping distortion. By this means, the influence of peak power suppression on received quality can be reduced, so that it is possible to reduce deterioration of received quality of multicarrier signals.

Further, power correcting section 403 may correct the power of the parallel data assigned to each subcarrier, based on the amount of clipping distortion per subcarrier. For example, power correcting section 403 may correct the power of the parallel data assigned to each subcarrier such that the SNR's (Signal to Noise Ratio) of OFDM signals are uniform in the frequency band. By this means, even when the power of a peak suppressing signal differs per subcarrier, it is possible to suppress the influence of clipping distortion reliably according to the degree of the peak suppressing signal and also equalize the effect of error correction in the OFDM band.

A multicarrier communication according to the first aspect of the present invention employs a configuration having: a generating section that generates a multicarrier signal by superimposing a transmission signal over a plurality of subcarriers; a peak power suppressing section that suppresses power appearing in the multicarrier signal and being equal to or greater than a predetermined value; a suppression distortion calculating section that divides all subcarriers into a central portion including a center subcarrier and edge portions adjacent to the central portion, and calculates suppression distortion of the multicarrier signal subjected to peak power suppression in the central portion and in the edge portions separately; and a selecting section that selects a coding rate, modulation scheme and power of a transmission signal superimposed over the central portion apart from the edge portions, based on the suppression distortion of the central portion.

With this configuration, greater suppression distortion is estimated in the central portion than in the edge portions. As a result, coding rate, modulation scheme and power with greater error robustness are selected for a transmission signal to be superimposed over the central portion compared to a transmission signal to be superimposed over the edge portions. That is, by selecting coding rates, modulation schemes and power in the central portion and the edge portions, coding rate selection, modulation scheme selection and power selection processing can be performed according to the actual characteristics of suppression distortion occurring, so that it is possible to suppress peak power of a multicarrier signal and reduce deterioration of received quality due to peak power suppression together, without reducing transmission speed and increasing transmission power excessively. Further, it is possible to simplify the above-noted processing significantly compared to a case where the coding rate, modulation scheme and power of each subcarrier are selected based on the suppression distortion of each subcarrier.

In the above-described first aspect, a multicarrier communication according to the second aspect of the present invention employs a configuration where the selecting section contains a storage section that stores an association table associating suppression distortion with a candidate of a coding rate or a candidate of a modulation scheme, and, by reading a coding rate or modulation scheme associated with the suppression distortion in each area calculated by the suppression distortion calculating section, selects the coding rate and modulation scheme in each area.

With this configuration, a coding rate and modulation scheme are selected with reference to an association table provided inside in advance, so that it is possible to specify a coding rate and modulation scheme easily and reliably from the measurement result of suppression distortion.

In the above-described first aspect, a multicarrier communication according to the third aspect of the present invention employs a configuration further having an acquiring section that acquires received quality information and where the selecting section selects the coding rate, modulation scheme and power of the transmission signal superimposed over each area based on the received quality information in addition to the suppression distortion of each area.

With this configuration, by selecting a coding rate and modulation scheme based on received quality information, a coding rate and modulation scheme are selected more adequately in consideration of channel condition, so that it is possible to improve error rate characteristics more reliably.

In the above-described first aspect, a multicarrier communication according to the fourth aspect of the present invention employs a configuration further having a power correcting section that makes power of a transmission signal greater in positions closer to the center subcarrier in each area.

With this configuration, in view of the characteristic that the power of a peak suppressing signal becomes greater in positions closer to the center subcarrier, by making the power of a transmission signal greater in positions closer to the center subcarrier, it is possible to suppress the influence of the peak suppressing signal on received quality more reliably.

In the above-described first aspect, a multicarrier communication according to the fifth aspect of the present invention employs a configuration further having a power correcting section that corrects power of a transmission signal such that a power ratio of desired power and suppression distortion power is uniform between subcarriers.

With this configuration, transmission signal power is corrected such that signal power to distortion power ratios for all subcarriers are uniform, so that it is possible to equalize the effect of error correction in the OFDM signal band.

In the above-described first aspect, a multicarrier communication according to the sixth aspect of the present invention employs a configuration where the central portion is formed with a predetermined, fixed number of subcarriers.

With this configuration, by determining the central portion in advance, when the frequency characteristic of a peak suppressing signal is uniform, it is possible to measure suppression distortion in the central portion easily and reduce the influence of the peak suppressing signal on received quality.

In the above-described first aspect, a multicarrier communication according to the seventh aspect of the present invention employs a configuration where the number of subcarriers forming the center subcarrier increases more when the amount of suppression in the peak power suppression section becomes greater.

With this configuration, in view of the characteristic that distortion spreads from the center subcarrier to both edge subcarriers, by making the central portion wider when the amount of suppression is greater, it is possible to flexibly select a coding rate, modulation scheme and power in response to the spread of distortion according to the amount of suppression. As a result, it is possible to increase error robustness adequately according to the amount of suppression.

A multicarrier communication method according to the eighth aspect of the present invention has the steps of: generating a multicarrier signal by superimposing a transmission signal over a plurality of subcarriers; suppressing power appearing in the multicarrier signal and being equal to or greater than a predetermined value; dividing all subcarriers into a central portion including a center subcarrier and edge portions adjacent to the central portion, and calculating suppression distortion of the multicarrier signal subjected to peak power suppression in the central portion and in the edge portions separately; and selecting a coding rate, modulation scheme and power of the transmission signal superimposed over the central portion apart from the edge portions, based on the suppression distortion of the central portion.

With this configuration, by calculating greater suppression distortion in the central portion than in the edge portions, it is possible to select a coding rate, modulation scheme and power with greater error robustness for a transmission signal to be superimposed over the central portion compared to a transmission signal to be superimposed over the ends area. That is, by selecting the coding rate, the modulation scheme and the power in the central portion and the ends area, coding rate selection, modulation scheme selection and power selection processing can be performed according to the actual characteristics of suppression distortion occurring, so that it is possible to suppress the peak power of a multicarrier signal and reduce deterioration of received quality due to peak power suppression together, without reducing transmission speed and increasing transmission power excessively. Further, it is possible to simplify the above-noted processing significantly compared to a case where the coding rate, modulation scheme and power of each subcarrier are selected based on the suppression distortion of each subcarrier.

The present application is based on Japanese Patent Application No. 2005-282458, filed on Sep. 28, 2005, the entire content of which is expressly incorporated by reference herein.

INDUSTRIAL APPLICABILITY

The multicarrier communication apparatus and multicarrier communication method according to the present invention can suppress the peak power of a multicarrier signal and reduce deterioration of received quality due to the peak power suppression, so that the multicarrier communication apparatus and multicarrier communication method are available for, for example, suppressing the peak power by clipping.

The invention claimed is:

1. A multicarrier communication apparatus comprising:
   a generating section that generates a multicarrier signal by superimposing a transmission signal over a plurality of subcarriers;
   a peak power suppressing section that suppresses power appearing in the multicarrier signal and being equal to or greater than a predetermined value;
   a suppression distortion calculating section that divides all subcarriers into a central portion including a center subcarrier and edge portions adjacent to the central portion, and calculates suppression distortion of the multicarrier signal subjected to peak power suppression in the central portion and in the edge portions separately; and
   a selecting section that selects at least one of a coding rate, modulation scheme and power of a transmission signal superimposed over the central portion apart from the edge portions, based on the suppression distortion of the central portion.

2. The multicarrier communication apparatus according to claim 1, wherein the selecting section comprises a storage section that stores an association table associating suppression distortion with at least one of a candidate of a coding rate and a candidate of a modulation scheme, and by reading at least one of the coding rate and modulation scheme associated with the suppression distortion in each area calculated by the suppression distortion calculating section, selects at least one of the coding rate and modulation scheme in said each area.

3. The multicarrier communication apparatus according to claim 1, further comprising an acquiring section that acquires received quality information,
   wherein the selecting section selects at least one of the coding rate, modulation scheme and power of the transmission signal superimposed over said each area based on the received quality information in addition to the suppression distortion of said each area.

4. The multicarrier communication apparatus according to claim 1, further comprising a power correcting section that makes power of a transmission signal greater in positions closer to the center subcarrier in said each area.

5. The multicarrier communication apparatus according to claim 1, further comprising a power correcting section that corrects power of a transmission signal such that a power ratio of desired power and suppression distortion power is uniform between subcarriers.

6. The multicarrier communication apparatus according to claim 1, wherein the central portion is formed with a predetermined, fixed number of subcarriers.

7. The multicarrier communication apparatus according to claim 1, wherein the number of subcarriers forming the center subcarrier increases more when the amount of suppression in the peak power suppression section becomes greater.

8. A multicarrier communication method comprising the steps of:
   generating a multicarrier signal by superimposing a transmission signal over a plurality of subcarriers;
   suppressing power appearing in the multicarrier signal and being equal to or greater than a predetermined value;
   dividing all subcarriers into a central portion including a center subcarrier and edge portions adjacent to the central portion, and calculating suppression distortion of the multicarrier signal subjected to peak power suppression in the central portion and in the edge portions separately; and
   selecting at least one of a coding rate, modulation scheme and power of the transmission signal superimposed over the central portion apart from the edge portions, based on the suppression distortion of the central portion.

* * * * *